Figure 1:
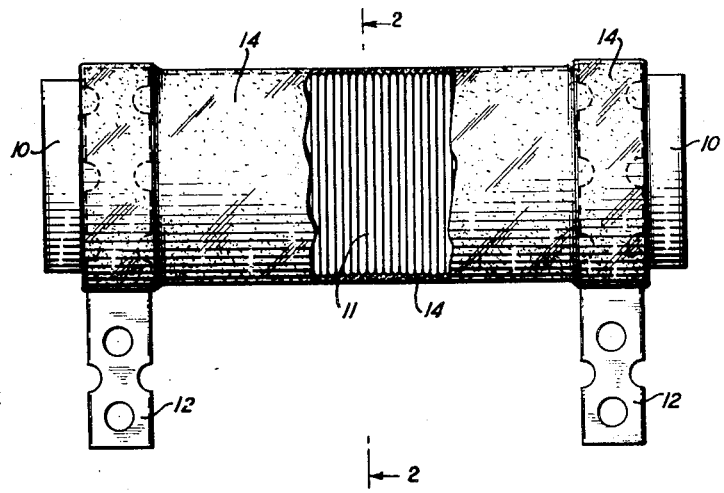

May 23, 1950  G. GOODMAN  2,508,511

RESISTOR COATED WITH CERAMIC COMPOSITION

Filed Dec. 12, 1946

INVENTOR
G. GOODMAN
BY
B.H. Jackson
ATTORNEY

Patented May 23, 1950

2,508,511

UNITED STATES PATENT OFFICE 2,508,511

RESISTOR COATED WITH CERAMIC COMPOSITION

Gilbert Goodman, Bayonne, N. J., assignor to Bell Telephone Laboratories, Incorporated, New York, N. Y., a corporation of New York Application December 12, 1946, Serial No. 715,771

2 Claims. (Cl. 201—76)

This invention relates to wire wound resistors coated with ceramic compositions.

In the manufacture of wire wound resistors utilizing resistance wire wound on cores made of insulating materials such as ceramics, it has been the practice to insulate the resistor with a ceramic coating. It has been found that the wires of such resistors sometimes become displaced from their positions when the resistor is fired. It is believed that this is caused by the fact that an enamel which is viscous and has a relatively high surface tension, tends to pull away from a break made in its surface by escaping gas bubbles which are formed from entrapped air and from the decomposition of certain constituents of the enamel when the latter is fired. As the break in the surface of the enamel grows in size, the wires under the enamel coating may be pulled away from their positions, leaving the core of the resistor bare.

In accordance with this invention, this difficulty is overcome by adding a bismuth compound to a frit to produce an enamel having a high fluidity and a relatively low surface tension at the temperatures ordinarily used in firing enamels. During the firing of such an enamel an escaping gas bubble may break through the surface of the enamel, but the break closes over at once on account of the high fluidity and low surface tension of the enamel.

The addition of bismuth compounds has been found particularly suitable for improving the properties of boro-silicate frits containing silica, boron oxide, and lead oxide. If desired such frits may contain various other non-essential constituents to improve the properties.

Figure 2:
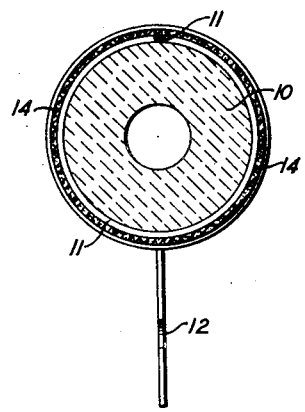

Such ceramic compositions are particularly effective for coating wire wound resistors as shown in the drawing wherein:

Fig. 1 is an elevation of a wire wound resistor coated with a ceramic composition in accordance with the present invention, with a portion of the ceramic coating composition cut away; and Fig. 2 is a cross-section of the wire-wound resistor of Fig. 1 taken along the line 2—2.

It has been found that a lead-boro-silicate frit suitable for coating wire-wound resistors and for other applications may be made up of the following ingredients in parts by weight as indicated:

| Ingredient | Parts by Weight | |
|---|---|---|
| | A | B |
| Flint ($SiO_2$) | 25.7 | 25.0 |
| Red Lead ($Pb_3O_4$) | 24.5 | 23.9 |
| Boric Acid ($H_3BO_3$) | 18.2 | 17.8 |
| Chromic Oxide ($Cr_2O_3$) | 0.9 | 0.8 |
| Nickelic Oxide ($Ni_2O_3$) | 0.9 | 0.8 |
| Bismuth Subcarbonate ($Bi_2O_2CO_3$) | 16.5 | |
| Bismuth Subnitrate ($BiONO_3$) | | 18.6 |
| Sodium Carbonate ($Na_2CO_3$) | 5.8 | 5.7 |
| Potassium Carbonate ($K_2CO_3$) | 5.0 | 4.9 |
| Calcium Oxide (CaO) | 2.6 | 2.5 |

It is preferable to add the bismuth compound in such amounts that the final composition after firing will contain from 17 per cent to 19 per cent of bismuth oxide by weight. However, the bismuth compound may be added in such amounts that the final composition after firing contains from 10 per cent to 30 per cent by weight of bismuth oxide. Throughout the present specification bismuth oxide is calculated as $Bi_2O_3$. Aside from the bismuth compound, the percentages of the other ingredients in the frits shown above are not critical, and considerable departures may be made from the proportions shown above.

Although the frits A and B shown above are the preferred compositions, the frits C, D, E and F, shown below may also have a bismuth compound incorporated therein in accordance with the present invention. The bismuth compound may be added to frits C, D, E, F in such quantities that after firing, the composition will contain from 10 parts to 30 parts of bismuth oxide by weight.

Bismuth may be added to the frit compositions A, B, C, D, E, F, and to other frits, in the form of bismuth oxide or any compound which will form bismuth oxide on heating, such as bismuth hydroxide, bismuth subcarbonate, and bismuth subnitrate.

| Ingredient | Parts by weight | | | |
|---|---|---|---|---|
| | C | D | E | F |
| Flint (SiO₂) | 27.0 | 34.7 | 35.7 | 36.9 |
| Red Lead (Pb₃O₄) | 10.0 | 18.5 | 19.6 | 22.8 |
| Potash Feldspar (K₂O, Al₂O₃, 6SiO₂) | 23.0 | | | |
| Boric Acid (HBO₃) | 10.0 | 8.9 | 30.9 | 29.9 |
| Borax (Na₂B₄O₇) | 26.0 | 30.8 | 6.6 | |
| Potassium Nitrate (KNO₃) | | 5.7 | 5.8 | |
| Chromic Oxide (Cr₂O₃) | | 0.9 | 0.9 | 0.9 |
| Cobaltic Oxide (Co₂O₃) | 0.5 | 0.5 | 0.5 | 0.8 |
| Sodium Nitrate (NaNO₃) | 3.0 | | | |
| Manganese Dioxide (MnO₂) | 0.5 | | | |
| Titanium Dioxide (TiO₂) | | | | 2.5 |
| Potassium Chloride (KCl) | | | | 4.6 |
| Sodium Fluoride (NaF) | | | | 1.6 |

Considerable departures may be made in the proportions of the ingredients shown in frits A through F. For example, the red lead content of the composition may vary widely. The final composition should contain the oxides of boron, lead and silicon, and no other ingredients than these are essential to the frits to which the bismuth compound may be advantageously added. However, other ingredients, such as those shown in the frits A through F, may be added to the mixture of flint, red lead and boric acid to improve the final properties of the frit.

For example, the oxides of nickel, cobalt and chromium may be added to reduce the solvent action of the molten frit on the wire of the resistor. The salts of sodium and potassium, and potash feldspar produce oxides of the alkali metals which act as fluxes. The oxides of calcium and titanium help to make the frit more resistant to chemical attack. The borax supplies sodium oxide, which acts as a flux, as well as the essential boron oxide. Compositions containing a large amount of borax may contain a smaller amount of boric acid. Manganese dioxide may be added to color the frit.

It is to be understood that specific minerals mentioned above in the frit compositions are used as convenient sources of the oxides of which they are composed and that any other equivalent source which will yield a frit of the desired oxide composition may be employed.

The mixed frit composition is heated and when melted, it is allowed to flow into relatively cold water, thus "shattering" the frit. The frit is further pulverized in a ball mill.

The frit is suitable for use after the step of shattering and pulverization described above. However, the properties of the frit may be improved by incorporating it in the pulverized form in an enamel slip to form a composition which may have the following proportions by weight:

| | |
|---|---|
| Frit | 100.0 |
| Colloidal clay | 2.0 |
| Strontium chloride (SrCl₂) | 2.0 |
| Zirconium oxide (ZrO₂) | 9.0 |

These components may be mixed in a ball mill with a suitable amount of water to provide a fluidity and viscosity consistent with the planned use of the enamel and with the available apparatus. Departures may be made in the proportions shown in the example of the slip. The zirconium oxide is added to provide opacity, while the addition of colloidal clay or of electrolytes such as strontium chloride or magnesium oxide provide thixotropic properties.

The slip may be used as a coating for a wire-wound resistor as shown in Fig. 1 in which a core 10 of insulating material is wound with electrical resistance wire 11, and provided with terminal bands 12 of any suitable type. The wire-wound resistor may be coated by dipping it in the slip or by allowing the slip to flow onto the resistor thereby covering it and forming a smooth continuous coating 14 on the surface of the wire-wound resistor. The portion of the terminal bands 12 which actually surround the core 10 may be coated with the slip as shown in Fig. 1, or they may be left uncoated if desired. The covered coated resistor is then dried in a normal atmosphere and subjected to heat to fire the enamel. The temperature of firing is ordinarily in the range of from about 500 degrees centigrade to 800 degrees centigrade, or above, and the time of heating should be at least long enough to cause the material to fuse. It will be found that during the firing bubbles escape easily from the surface of the enamel. The present compositions may be used for other purposes besides coating resistors.

Various changes and modifications may be made in the disclosed embodiments without departing from the spirit and scope of the invention.

What is claimed is:

1. An electrical resistor comprising a wire-wound ceramic core coated with a fused enamel glaze resulting from the fusing of a mixture of colloidal clay and a finely divided lead borosilicate frit consisting of 25 per cent to 36.9 per cent $SiO_2$, 10 per cent to 24.5 per cent $Pb_3O_4$, 8.9 per cent to 30.9 per cent $H_3BO_3$ and 10 per cent to 30 per cent $Bi_2O_3$.

2. An electrical resistor comprising a wire-wound ceramic core coated with a fused enamel glaze resulting from the fusing of a mixture containing 2 parts by weight of colloidal clay and 100 parts by weight of a finely divided lead borosilicate frit consisting of 25 per cent to 36.9 per cent $SiO_2$, 10 per cent to 24.5 per cent $Pb_3O_4$, 8.9 per cent to 30.9 per cent $H_3BO_3$ and 10 per cent to 30 per cent $Bi_2O_3$.

GILBERT GOODMAN.

REFERENCES CITED

The following references are of record in the file of this patent:

UNITED STATES PATENTS

| Number | Name | Date |
|---|---|---|
| 257,643 | Benas et al. | May 9, 1882 |
| 2,018,600 | Brown | Oct. 22, 1935 |
| 2,207,723 | Deyrup | July 16, 1940 |
| 2,370,443 | Biefeld | Feb. 27, 1945 |
| 2,385,580 | Knox | Sept. 25, 1945 |
| 2,425,032 | Deyrup | Aug. 5, 1947 |